United States Patent [19]

Park

[11] Patent Number: 5,581,716
[45] Date of Patent: Dec. 3, 1996

[54] IDE TYPE CD-ROM DRIVE INTERFACING CIRCUIT

[75] Inventor: Moohum Park, Seoul, Rep. of Korea

[73] Assignee: Samsung Electronics Co., Ltd., Kyungki-Do, Rep. of Korea

[21] Appl. No.: 344,595

[22] Filed: Nov. 18, 1994

[30] Foreign Application Priority Data

Nov. 20, 1993 [KR] Rep. of Korea .................... 93-24851

[51] Int. Cl.⁶ .................................................. G06F 13/10
[52] U.S. Cl. ..................... 395/309; 395/500; 364/236.2; 364/248.1; 364/238.2; 364/238.3; 364/239.9; 364/DIG. 1
[58] Field of Search ..................................... 395/309, 500

[56] References Cited

U.S. PATENT DOCUMENTS

| | | | |
|---|---|---|---|
| 5,150,465 | 9/1992 | Bush et al. | 395/275 |
| 5,297,067 | 3/1994 | Glackborow et al. | 364/708.1 |
| 5,434,722 | 7/1995 | Bizjak et al. | 360/69 |
| 5,448,700 | 9/1995 | Kim | 395/310 |

*Primary Examiner*—Kevin J. Teska
*Assistant Examiner*—Ayni Mohamed
*Attorney, Agent, or Firm*—Sughrue, Mion, Zinn, Macpeak & Seas

[57] ABSTRACT

An interface circuit for an IDE-type CD-ROM drive connected to a personal computer using a standard IDE interface according to a hard disk drive interface standard includes a drive selecting circuit for generating a buffer gate signal a control circuit for generating a command signal, a drive read signal, a drive write signal and a drive reset signal responsive to an IDE port address, an input/output read signal, an input/output write signal and a reset signal, for providing the received signal to the IDE interface by receiving handshake signals, a data buffer for transmitting the data in a specified direction determined according to the drive read signal, and a master-slave communication circuit for generating communication signals in response to a reset signal from the IDE interface.

9 Claims, 4 Drawing Sheets

5,581,716

1

IDE TYPE CD-ROM DRIVE INTERFACING CIRCUIT

BACKGROUND OF THE INVENTION

1. Field of the Invention

The present invention relates to an interface circuit for a compact disk (CD) read-only memory (ROM) drive and, more particularly, to the interface circuit for an Integrated Drive Electronics (IDE)-type CD-ROM drive which can be connected to a personal computer using an IDE interface as the hard disk drive interfacing standard.

The instant application is based on Korean Patent Application No. 93-24851, which is incorporated herein by reference for all purposes.

2. Discussion of Related Art

The conventional CD-ROM drive interface requires an interface capable of communicating between a CD-ROM drive and a personal computer. The interface is usually accomplished by attaching an independent CD-ROM drive interface board or another type of common interface board, for example, a Small Computer Systems Interface (SCSI) standard bus circuit, to an Industry Standard Architecture (ISA) connector on the personal computer. Thus a special interfacing board is necessary. Moreover, it is inconvenient to attach the board to the ISA connector. Potential applications for the computer are also decreased since the interface board occupies one slot space on the motherboard of the computer.

It will be noted that in the conventional personal computer system, two IDE hard disk drives (HDDs), one acting as a master and the other as a slave, are connected directly via a 40-pin connector to an IDE interface connected to the ISA connector or to an installed IDE connector on the motherboard of the computer.

Since personal computers generally employ only one hard disk drive, one of the IDE interface connectors has been wasted.

SUMMARY OF THE INVENTION

An object of the invention is to provide a CD-ROM drive interface circuit enabling a CD-ROM drive to be used in a personal computer by connecting the CD-ROM drive having an IDE interface for a hard disk drive of the personal computer.

This and other objects, features and advantages of the present invention are provided by an interface circuit for a CD-ROM drive, wherein a hard disk drive is connected as a master drive and the CD-ROM drive is connected as a slave drive to a personal computer via an IDE interface. The interface includes:

a drive selecting circuit for generating a buffer gate signal if a drive bit is written from the IDE interface to a port address;

a control circuit for receiving an IDE port address, an input/output read signal, an input/output write signal and a reset signal after the buffer gate signal is activated, for outputting to the CD-ROM drive a command signal, a drive read signal, a drive write signal and a drive reset signal, for receiving a handshake signal, and for outputting the handshake signal to the IDE interface;

a data buffer responsive to the buffer gate signal, for transmitting data in the data transmission direction determined according to the drive read signal; and

2 a master-slave communication circuit for receiving a reset signal from the IDE interface, generating communication signals and outputting the communication signals into the IDE interface, thereby communicating with the hard disk drive, wherein the CD-ROM drive is simply connected to a personal computer via the IDE interface of a hard disk drive interface.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
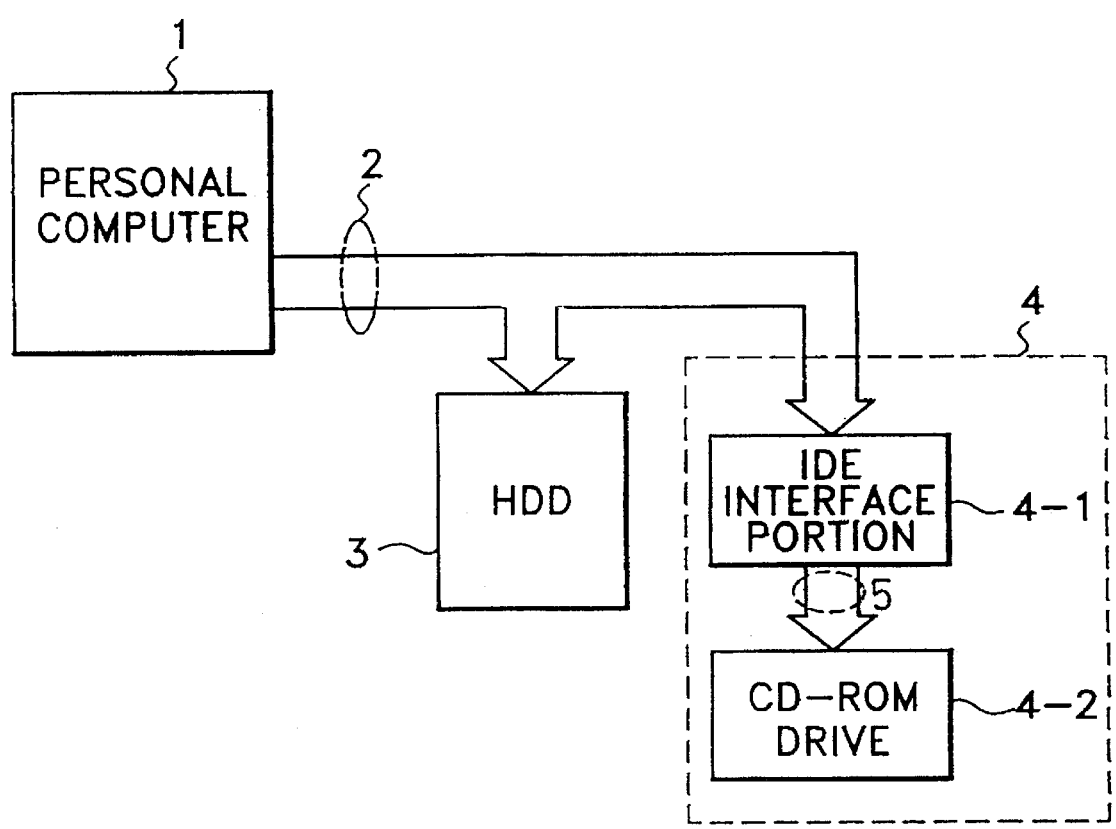
FIG. 1 is a high level schematic diagram showing a personal computer system using a CD-ROM drive interface circuit according to an embodiment of the present invention.

Referring to FIG. 1, a personal computer system comprises a personal computer 1, an IDE interface bus 2, a hard disk drive (HDD) 3 and an IDE-type CD-ROM drive 4 having an IDE interface portion 4-1, a CD-ROM drive 4-2 and a bus 5 for interfacing IDE interface portion 4-1 with CD-ROM drive 4-2.

Personal computer 1 is a common piece of equipment, which is generally IBM-PC compatible, and which advantageously can be used in connection with peripheral equipment. HDD 3 has the disk drive interface portion in its respective disk drive controller. In an exemplary case, the personal computer provides the disk drive interface with a partial signal going to the ISA connector and with a decoding signal output from an input/output (I/O) controller (for example, an 82C710 chip controller) of the personal computer via a buffer.

IDE interface bus 2 is a bus for a hard disk drive, which is connected to a 40-pin connector furnished on the motherboard of the personal computer on one end and to one or two HDDs on the other end. It will be noted that IDE interface bus 2 supports two hard disk drives disposed in a master and slave configuration. The IDE interface is an industrial standard and will not be described. In an exemplary case, HDD 3 is a general IDE-type HDD capable of connection to IDE interface bus 2.

IDE CD-ROM drive 4 includes an IDE interface portion 4-1, which advantageously can be connected to IDE interface bus 2 for accessing information recorded on a large-capacity optical disk, e.g., a compact disk, thereby exchanging data with personal computer 1. It will be appreciated that to connect CD-ROM drive 4-2 to the IDE interface for connection with HDD 3, a circuit receiving the signals being used in the IDE interface and interpreting the signals is required for the IDE CD-ROM drive. IDE interface portion 4-1 shown in FIG. 1 performs such functions.

Personal computer 1 in FIG. 1 writes or reads data to or from HDD 3 via IDE interface bus 2 and gives commands or reads status signals and data to or from IDE CD-ROM drive 4, using software installed in personal computer 1.

Figure 2:
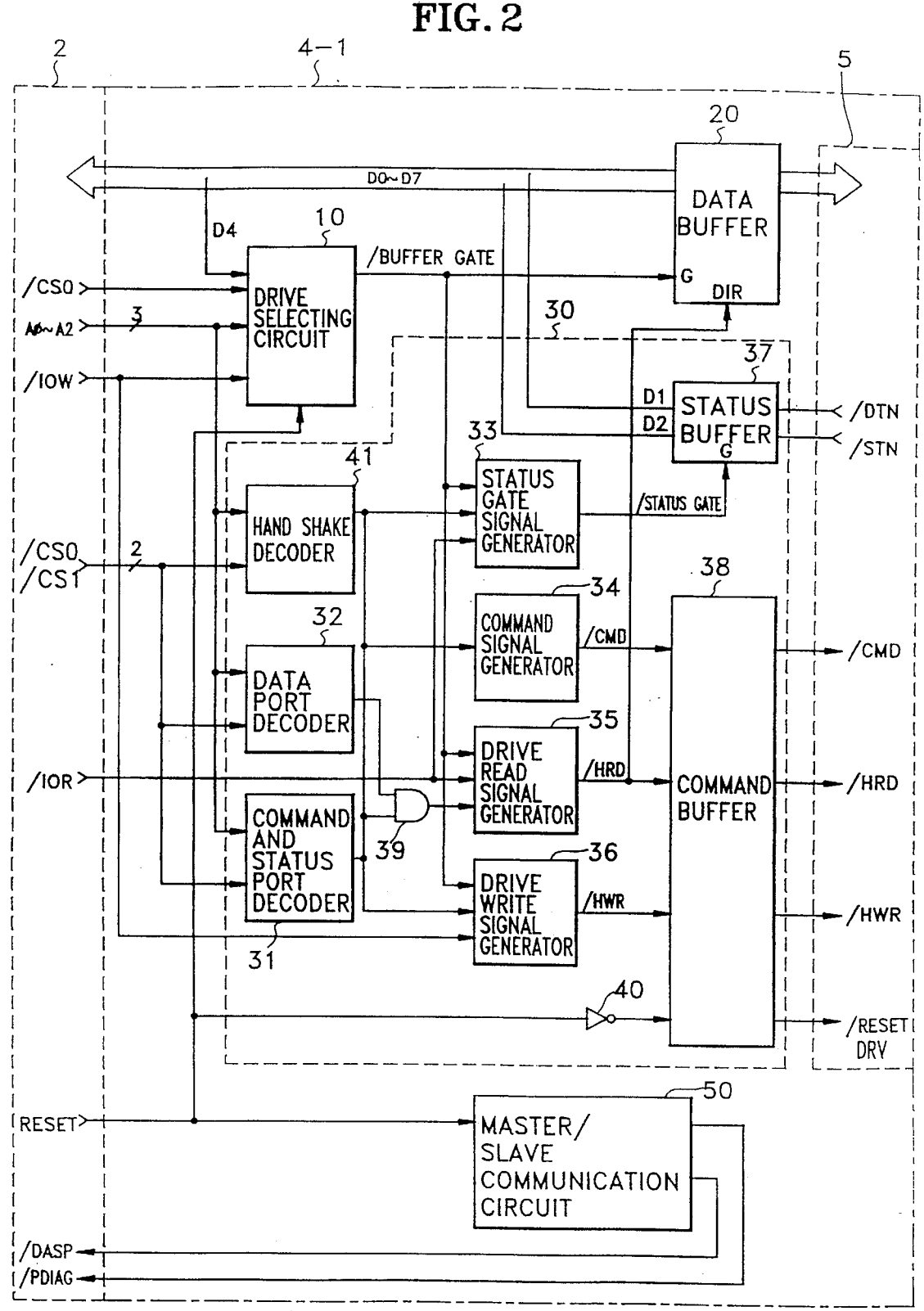
FIG. 2 is a detailed block diagram showing a CD-ROM drive interface circuit according to the present invention.

FIG. 2 is a detailed block diagram showing the IDE interface circuit 4-1 for the CD-ROM according to an embodiment of the present invention. IDE interface circuit 4-1 includes a drive selecting circuit 10, a data buffer 20, a control circuit 30, and a master-slave communication circuit 50. Preferably, control circuit 30 contains a command and status port decoder 31, a data port decoder 32, a status gate signal generator 33, a command signal generator 34, a drive read signal generator 35, a drive write signal generator 36, a status buffer 37, a command buffer 38, an OR gate 39, an inverter 40, and a handshake decoder 41. The circuit of FIG. 2 corresponds to the IDE interface portion 4-1 shown in FIG. 1.

In order to drive CD-ROM drive 4-2 using an IDE interface, the signal used in the IDE interface, input/output (I/O) ports 1F0H–1F7H, 3F6H and 3F7H, have to be used. However, if the signal is used intact, the signal is overlapped with the signal used in HDD 3, thereby failing normal operation. To solve this problem, the primary-use HDD 3 and IDE CD-ROM drive 4 have to be operated in a master and slave configuration, respectively. Preferably, to drive IDE CD-ROM drive 4 using the master-slave concept, IDE CD-ROM drive 4 should not be accessed when HDD 3 is being accessed and HDD 3 should not be accessed when IDE CD-ROM drive 4 is being accessed.

In order to independently operate the HDD 3 and IDE CD-ROM drive 4, the hardware is configured such that, using a drive bit (D4), HDD 3 is accessed when the drive bit is at one logic state, e.g., "0" and IDE CD-ROM drive 4 is accessed when the drive bit is at the other logic state, e.g. "1".

That is, drive selecting circuit 10 receives the drive bit via data line D4 of the data bus on the IDE interface side, a port address signal (/CSO, A0–A2) and an I/O write signal (/IOW), and outputs a buffer gate signal to the gate (G) port of data buffer 20 as well as to status gate signal generator 33, drive read signal generator 35 and drive write signal generator 36. The buffer gate signal is activated when personal computer 1 loads a logic "1" on data line D4 by accessing the I/O port 1F6H.

On the other hand, when HDD 3 and IDE CD-ROM drive 4 can be independently selected, the control signal for interfacing IDE CD-ROM drive 4 has to be made using an IDE I/O port. Preferably, the control signals required for interfacing IDE CD-ROM drive 4 are a command signal (/CMD), a drive read signal (/HRD), a drive write signal (/HWR) and a reset drive signal (/RESET DRV) which are transmitted directly to IDE CD-ROM drive 4 from the personal computer 1, and status enable (/STN) and data enable (/DTN) signals generated from IDE CD-ROM drive 4 for handshaking.

It will also be appreciated that in such an interface, the I/O ports for receiving data from IDE CD-ROM drive 4, for receiving command and status data, i.e., the port reads data as the status and writes data as the command, and, for receiving handshake signals /STN and /DTN from CD-ROM drive 4-1 have to be assigned. The available I/O ports in the IDE interface are 1F0H–1F7H, 3F6H and 3F7H. However, since port 1F6H is used for drive selecting circuit 10, the interface advantageously uses another port address.

Table 1 shows an example in which the I/O ports are assigned to IDE CD-ROM drive 4. Preferably, the port address is the input/output port address by which personal computer accesses IDE CD-ROM drive 4 via the IDE interface, and is decoded by an I/O controller on the personal computer whereby a specific port address is decided.

TABLE 1

| port address | CS0 | CS1 | /IOR | /IOW | function |
|---|---|---|---|---|---|
| 1F6H | L | H | — | L | select drive |
| 1F2H | L | H | L | — | read status |
|  |  |  | — | L | write command |
| 1F4H | L | H | L | — | read data |
| 3F6H | H | L | L | — | read handshake |

In a preferred embodiment according to the present invention, port address 1F6H is used for selecting a drive. Also, port address 1F2H is assigned to the command and status port, and is used for writing the command during an I/O write operation (/IOW is low) and reading the status data of CD-ROM drive 4-2 during an I/O read operation (/IOR is low). Port address 1F4H is assigned for the reading out the data, while port address 3F6H is assigned to the handshake decoder 41. The port address used in IDE CD-ROM drive 4 advantageously can be selected among the port addresses available for IDE operation by a designer.

On the other hand, CD-ROM drive 4-2 transmits the data through various phases including command transmission, data transmission and status transmission. Each respective phase is performed according to the operation of the interface signal described above. Table 2 shows the control signals required for performing a given operation when the port addresses are assigned according to Table 1.

TABLE 2

| signal | command transmission | data transmission | status transmission |
|---|---|---|---|
| /CMD | L | H | L |
| /HRD | — | L | L |
| /HWR | L | — | — |
| /DTN | — | L | — |
| /STN | — | — | L |

Referring to Table 2, during the command transmission, signal /CMD goes low and the command data are written on CD-ROM drive 4-2 according to signal /HWR. During the data transmission, the status of CD-ROM drive 4-2 is read, signal /CMD goes high when the signal /DTN is low and the data are read out from CD-ROM drive 4-2 according to signal /HRD. During the status transmission, the status of CD-ROM drive 4-2 is read, signal /CMD goes low when signal /STN is low and the status data are read out from CD-ROM drive 4-2 according to signal /HRD.

Control circuit 30 outputs the control signals, e.g., /CMD, /HRD, /HWR and /RESET DRV, to CD-ROM drive 4-2 for the operation of the interface signal as in Table 2.

Referring to Table 1, the I/O port address 1F2H is assigned to command and status port decoder 31. If the signals A0, A1 and A2 at IDE interface 4-1 are logic "0," "1" and "0," respectively, and the signals CS0 and CS1 are logic "0" and "1," respectively, the command and status port decoder 31 is selected to thereby activate the output signal, i.e., the command and status port selecting signal. Advantageously, the I/O port address 1F4H is assigned to data port decoder 32. If the signals A0, A1 and A2 at IDE interface 4-1 are logic "0," "0" and "1," respectively, and the signals CS0 and CS1 are logic "0" and "1," respectively, the data port decoder is selected to thereby activate the output signal i.e., the data port selecting signal.

Command signal generator 34 receives the output of command and status port decoder 31, i.e., the command and status port selecting signal, and generates command signal /CMD. Therefore, command signal /CMD is activated (active low) when personal computer 1 accesses input/output port 1F2H.

Meanwhile, drive read signal generator 35 receives the logical OR result of the outputs of command and status port decoder 31 and data port decoder 32, the buffer gate signal and an I/O read signal /IOR, and generates drive read signal /HRD. Preferably, drive read signal /HRD is activated when personal computer 1 performs a read operation by accessing the command and status port 1F2H or the data port 1F4H after the setting of IDE CD-ROM drive 4 as the slave, i.e., by means of writing a logic "1" onto data bus line D4, by accessing I/O port address 1F6H. Drive read signal /HRD advantageously can be input into the direction port (DIR) of data buffer 20, for determining the signal direction of the bi-directional data buffer 20. When personal computer 1 performs the I/O read operation, the drive read signal /HRD is transmitted from IDE CD-ROM drive 4 to IDE interface bus 2 via data buffer 20. Conversely, when an I/O write operation is performed, the signal (/HRD) is transmitted reversely, i.e., from IDE interface bus 2 to IDE CD-ROM drive 4 via data buffer 20.

Drive write signal generator 36 generates drive write signal /HWR by receiving the buffer gate signal, the output of command and status port decoder 31 and I/O write signal /IOW. Thus, the drive write signal /HWR is activated when personal computer 1 accesses the I/O port address 1F2H and performs an I/O write operation after the activation of the buffer gate signal.

Status gate signal generator 33 receives the output of handshake decoder 41, the buffer gate signal and I/O read signal /IOR, and outputs the status gate signal to status buffer 37. Status buffer 37, in turn, loads handshake signals /DTN and /STN input from CD-ROM drive 4-2 to a specific bit on the data bus if the status gate signal is activated. According to a preferred embodiment of the present invention, handshake signal /DTN is loaded on data bus line D1 and handshake signal /STN is loaded on data bus line D2. Therefore, when personal computer 1 performs an I/O read operation by accessing I/O port address 3F6H, handshake signals /DTN and /STN advantageously can be read via data bus lines D1 and D2.

Preferably, if signal /DTN is "0", it means that the personal computer can read the data, i.e., CD-ROM drive 4 is ready for data transmission. If signal /STN is "0", it signifies that the personal computer can read the status data, i.e., CD-ROM drive 4 is ready for status data transmission. Accordingly, the personal computer advantageously can recognize whether the data read via the data port is pure data or status data by evaluating these two handshake signals.

The reset signal advantageously is inverted via inverter 40, thereby generating the reset drive signal (/RESET DRV) for resetting CD-ROM drive 4-2. Command buffer 38 advantageously can be provided for buffering command signal /CMD, drive read signal /HRD, drive write signal /HWR and reset drive signal /RESET DRV, and outputs the resultant signals to CD-ROM drive 4-2.

When the buffer gate signal is activated, control circuit 30 receives signals A0, A1, A2, /CS0, /CS1, /IOR, /IOW and RESET, and outputs command signal /CMD, drive read signal /HRD, drive write signal /HWR and the reset drive signal (/RESET DRV). Preferably, the control circuit also receives signals /DTN and /STN from CD-ROM drive 4-2 and provides the received signals to IDE interface bus 2 via data bus lines D0–D7.

Master-slave communication circuit 50 receives the reset signal from IDE interface bus 2, outputs the Drive Active/Slave Present (/DASP) and Pass Diagnostics (/PDIAG) signals to IDE interface bus 2.

The IDE interface advantageously can be extended to operate two hard disk drives by identifying one as the master drive and one as the slaved drive. With the drives set as the master and the slave, respectively, communication is performed in accordance with IDE interface protocol. Examples of this communication protocol include the ISA original method, the Common Access Method AT Attachment (CAM ATA) method, the earlier, non-standard CONNER method and the ALTERNATE method. A preferred embodiment according to the present invention follows the widely-used CAM ATA communication protocol, which is sometimes referred to simply as the ATA-IDE method. The signals to be used in the communication are the /PDIAG and /DASP signals. Preferably, a register can be used during communication as an error register.

The communication between the master and the slave is performed by the generation of a hardware reset, e.g., a "power-on" reset signal which occurs when system power is applied, a software reset and a diagnostic command. Preferably, communication is not required on the generation of the software reset and diagnostic command when the IDE interface is applied to IDE CD-ROM drive 4. It will be appreciated that an initialization responsive to the software reset is not needed since IDE CD-ROM drive 4 is operated as the slave drive of the IDE interface, thus, the return result would not have any meaning. However, communication is necessary on the generation of the hardware reset signal since the master drive confirms the existence of the slave drive.

Figure 3:
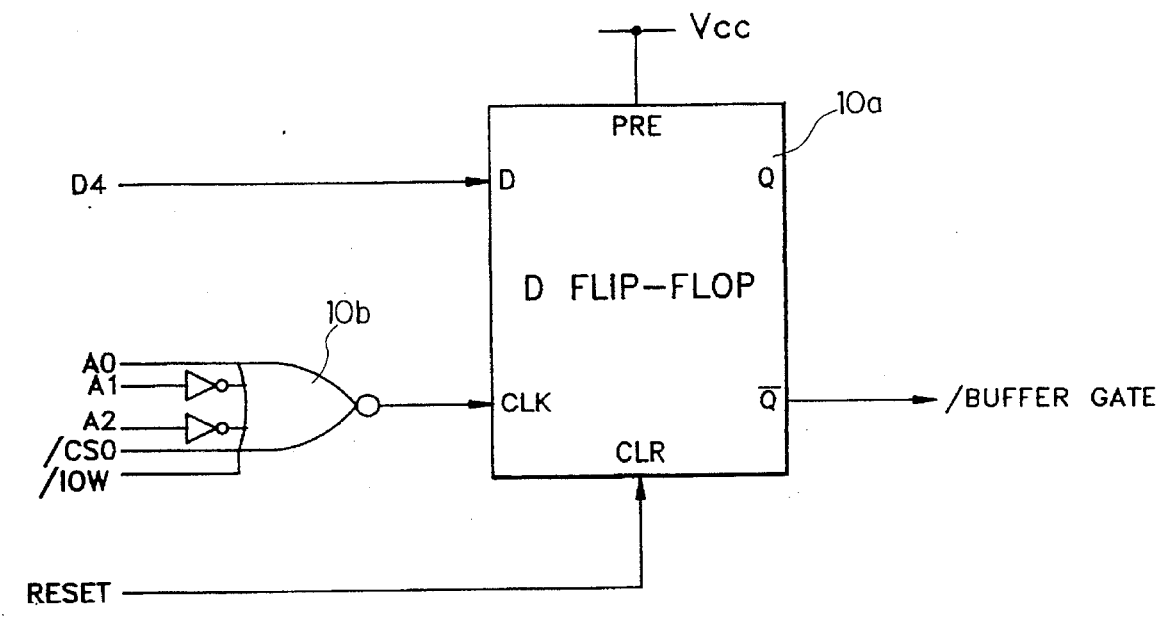
FIG. 3 is a circuit diagram showing the drive selecting circuit in FIG. 2.

FIG. 3 is a circuit diagram showing an exemplary drive selecting circuit 10 found in FIG. 2. Preferably, drive selecting circuit is composed of a D flip-flop 10a and logic circuit 10b. The data port of the D flip-flop 10b receives the fourth bit D4, its clock port receives the logical NOR result of signals A0, /A1, /A2, /CS0 and /IOW. Since the I/O port address of drive/head register is 1F6H, when the drive bit (D4) is a logic "1" at the I/O port, i.e., when the CD-ROM drive is selected as the slave, the output of the NOR gate is changed from low to high, and the result is fed to the clock port of flip-flop 10a, so that the output of the D flip-flop becomes a logic "0", i.e., the inverted drive bit value at the rising edge of a signal input to the clock port. The output becomes a gate signal of the data buffer. When the signal is low, the buffer is enabled.

Figure 4:
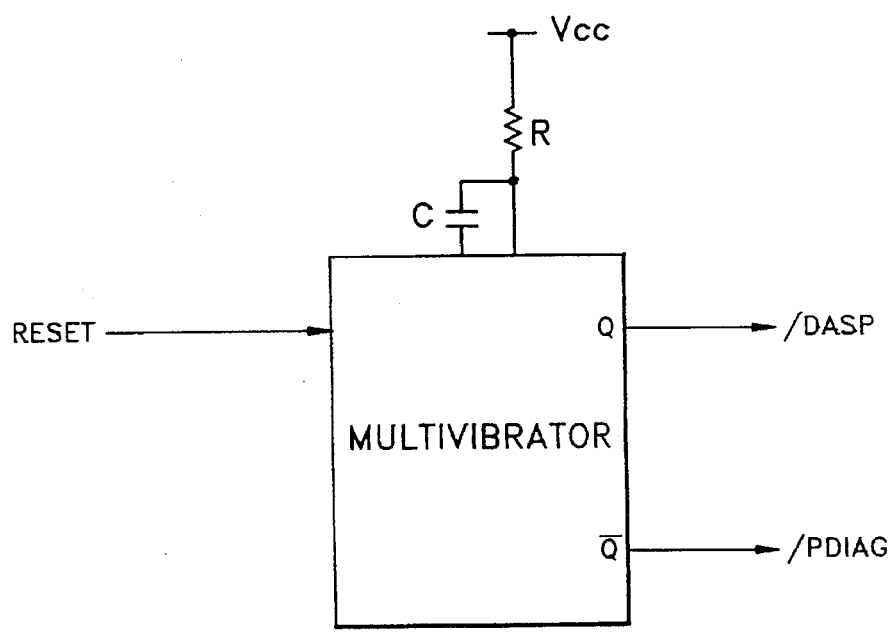
FIG. 4 is a circuit diagram showing the master-slave communication circuit in FIG. 2.

FIG. 4 is a circuit diagram showing the communication circuit shown in FIG. 2, which advantageously can be realized using a multivibrator. Referring to FIG. 4, pulse signals /PDIAG and /DASP, having respective pulse widths set by a resistance (R) and a capacitance (C), are output at the rising edge of the reset signal. Preferably, the pulse widths conform to the CAM ATA specification. The generation of signal /DASP is for informing the master of the existence of the slave, and the end of signal /PDIAG (after generation) represents that the slave is ready for receiving a command.

Figure 5:
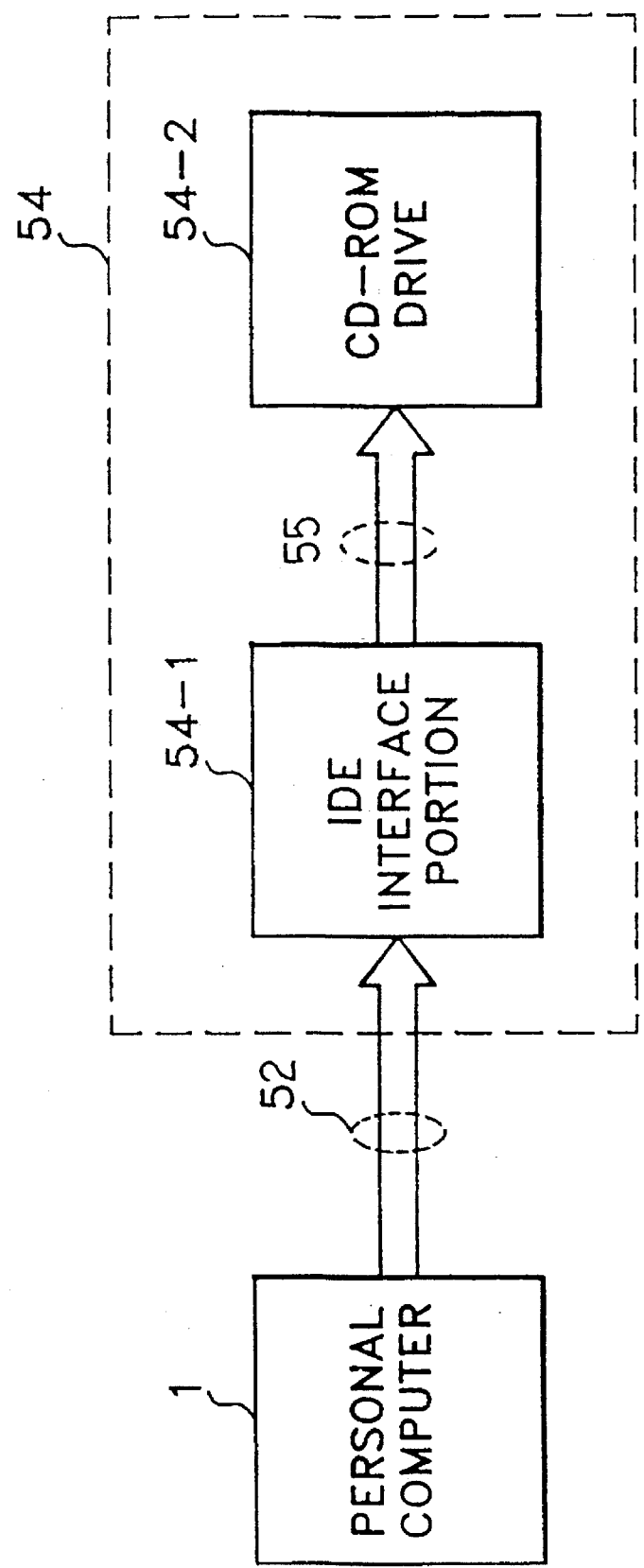
FIG. 5 is a high level schematic diagram showing another embodiment according to the present invention.

FIG. 5 is a schematic diagram showing the construction of another preferred embodiment according to the present invention. The preferred embodiment comprises a personal computer 51, an IDE interface bus 52 and a IDE CD-ROM drive 54.

Referring to FIG. 5, personal computer 51 is a general purpose computer, IDE interface bus 52 is the same as IDE interface bus 2 described with respect to FIG. 1, and IDE CD-ROM drive 54 has an IDE interface portion 54-1, a CD-ROM drive 54-2 and an internal bus 55. IDE CD-ROM drive 54 is the same as IDE CD-ROM drive 4 described with respect to FIG. 1. The preferred embodiment according to the present invention shown in FIG. 5 does not use the hard disk drive but only uses CD-ROM drive 54 directly connected to IDE interface bus 52.

As described above, the interface for CD-ROM drive of the present invention provides simple connection from a CD-ROM drive to a personal computer without requiring an extra interface board. The CD-ROM drive interface permits the IDE interface of a standard for hard disk drive to be used, thereby providing enhanced convenience and a cost savings for the interface.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A CD-ROM drive IDE interface circuit in which a hard disk drive is connected to a personal computer as a master drive via an IDE interface bus and to which a CD-ROM drive is connected as a slave drive, comprising:

a drive selecting circuit generating a buffer gate signal when a drive bit is written from said IDE interface bus to a port address;

a control circuit for receiving an IDE port address, an input/output read signal, an input/output write signal and a reset signal after the buffer gate signal is activated, for generating a command signal, a drive read signal, a drive write signal and a drive reset signal to the CD-ROM drive, and for providing the respective received signals to said CD-ROM drive and to said IDE interface bus responsive to signals from said CD-ROM drive;

a data buffer, activated by the buffer gate signal, for transmitting data in a data transmission direction determined according to the drive read signal; and a master-slave communication circuit, receiving a reset signal via said IDE interface bus, for generating communication signals and providing the communication signals to said IDE interface bus, and for communicating with the hard disk drive, wherein said CD-ROM drive is slave connected to an IDE interface operatively connected with the hard disk drive.

2. The CD-ROM drive interface as claimed in claim 1, wherein said drive selecting circuit comprises:

a flip-flop receiving a port address via said IDE interface bus, and an input/output write signal produced by a logic gate at a clock port thereof, a drive bit at a respective data port and said reset signal at a clear port, for outputting the buffer gate signal via an inverted output port of said flip-flop.

3. The CD-ROM drive interface as claimed in claim 1, wherein said control circuit comprises:

a command and status port decoder generating a first output signal when a port address representative of a command and status transmission is input;

a data port decoder for providing a second output signal when a port address representative of for a data transmission is input;

a handshake decoder generating a third output signal when a port address representative of accessing a handshaking signal is input;

a command signal generator for generating a command signal responsive to the first output signal of the command and status port decoder;

a drive read signal generator receiving said buffer gate signal, a fourth output signal representing a logical sum of the first output signal and the second output signal of the data port decoder, and the input/output read signal, for providing the drive read signal;

a drive write signal generator for generating the drive write signal responsive to the buffer gate signal, the first output signal and the input/output write signal;

a status gate signal generator for generating a status gate signal responsive to the buffer gate signal, the second output signal and the input/output read signal; and a status buffer receiving the handshake signals responsive to the status gate signal.

4. The CD-ROM drive interface circuit as claimed in claim 1, wherein said master-slave communication circuit comprises:

a resistance and capacitor network for establishing a predetermined time constant;

a multivibrator for generating a signal whose pulse width equals the predetermined time constant, responsive to the reset signal, and for providing a first communication signal via a non-inverted output port thereof and a second communication signal via an inverted output port thereof.

5. An IDE-type CD-ROM drive having an IDE interface circuit connecting the

CD-ROM drive to an IDE interface bus permitting a hard disk drive to be operatively connected to a personal computer, wherein said IDE interface circuit comprises:

a drive selecting circuit generating a buffer gate signal when a drive bit is written from the IDE interface bus to a specific port address;

a control circuit receiving an IDE port address, an input/output read signal, an input/output write signal and a reset signal after the buffer gate signal is generated for outputting a command signal, a drive read signal, a drive write signal and a drive reset signal to the CD-ROM drive, for receiving handshake signals from the CD-ROM drive, and for providing the handshake signals to the IDE interface bus;

a data buffer activated by the buffer gate signal, for transmitting data in a data transmission direction according to the drive read signal; and a master-slave communication circuit for generating communication signals responsive to receipt of the reset signal from the IDE interface bus and for providing communication signals to the IDE interface bus.

6. A CD-ROM drive IDE interface circuit in which a hard disk drive is connected to a personal computer as a master drive via an IDE interface bus and to which a CD-ROM drive is connected as a slave drive, comprising:

drive selecting means for generating a buffer gate signal when a drive bit is written from said IDE interface bus to a predetermined port address;

controller means for receiving an IDE port address, an input/output read signal, an input/output write signal and a reset signal after the buffer gate signal is generated, for generating a command signal, a drive read signal, a drive write signal and a drive reset signal to the CD-ROM drive, and for providing the respective received signals to said CD-ROM drive and to said IDE interface bus responsive to signals from said CD-ROM drive;

buffer means activated by the buffer gate signal for transmitting data in a data transmission direction determined according to the drive read signal; and master-slave communications means, receiving a reset signal via said IDE interface bus, for generating communication signals and providing the communication signals to said IDE interface bus, and for communicating with the hard disk drive, wherein said CD-ROM drive is slaved to an IDE interface operatively connected with the hard disk drive.

7. The CD-ROM drive interface as claimed in claim 6, wherein said drive selecting means comprises:

a flip-flop receiving a port address via said IDE interface bus, and an input/output write signal produced by a logic gate at a clock port thereof, a drive bit at a respective data port and said reset signal at a clear port, for outputting the buffer gate signal via an inverted output port of said flip-flop.

8. The CD-ROM drive interface as claimed in claim 6, wherein said controller means comprises:

command and status port decoder means for generating a first output signal when a port address representative of a command and status transmission is input;

data port decoder means for providing a second output signal when a port address representative of for a data transmission is input;

handshake decoder means for generating a third output signal when a port address representative of accessing a handshaking signal is input;

command signal generator means for generating a command signal responsive to the first output signal of said command and status port decoder means;

drive read signal generator means receiving said buffer gate signal, a fourth output signal representing a logical sum of the first output signal and the second output signal, and the input/output read signal, for providing the drive read signal;

drive write signal generator means for generating the drive write signal responsive to the buffer gate signal, the first output signal and the input/output write signal;

status gate signal generator means for generating a status gate signal responsive to the buffer gate signal, the second output signal and the input/output read signal; and status buffer means operatively connected between said IDE interface bus and said IDE CD-ROM for receiving the handshake signals responsive to the status gate signal provided by said status gate signal generator means.

9. The CD-ROM drive interface circuit as claimed in claim 6, wherein said master-slave communications means comprises:

means for establishing a predetermined time constant;

pulse generating means for generating a signal whose pulse width equals the predetermined time constant, responsive to the reset signal, and for providing a first communication signal via a non-inverted output port thereof and a second communication signal via an inverted output port thereof.

* * * * *